(12) United States Patent
Sahin et al.

(10) Patent No.: US 11,947,805 B2
(45) Date of Patent: Apr. 2, 2024

(54) LOAD BALANCING USING STORAGE SYSTEM DRIVEN HOST CONNECTIVITY MANAGEMENT

(71) Applicant: Dell Products L.P., Round Rock, TX (US)

(72) Inventors: Adnan Sahin, Needham, MA (US); Rivka Mayraz Matosevich, Zichron Ya'acov (IL); Mark J. Halstead, Holliston, MA (US); Ziv Dor, Rishon Letzion (IL)

(73) Assignee: Dell Products L.P., Round Rock, TX (US)

( * ) Notice: Subject to any disclaimer, the term of this patent is extended or adjusted under 35 U.S.C. 154(b) by 123 days.

(21) Appl. No.: 17/728,606

(22) Filed: Apr. 25, 2022

(65) Prior Publication Data

US 2023/0342037 A1 Oct. 26, 2023

(51) Int. Cl.
*G06F 3/06* (2006.01)
(52) U.S. Cl.
CPC .......... *G06F 3/0613* (2013.01); *G06F 3/0659* (2013.01); *G06F 3/067* (2013.01)
(58) Field of Classification Search
None
See application file for complete search history.

(56) References Cited

U.S. PATENT DOCUMENTS

| | | | |
|---|---|---|---|
| 7,805,566 B2 | 9/2010 | Abouelwafa et al. | |
| 11,461,031 B1 | 10/2022 | Moran et al. | |
| 2007/0239954 A1 | 10/2007 | Sakashita et al. | |
| 2013/0212345 A1 | 8/2013 | Nakajima | |
| 2018/0181328 A1* | 6/2018 | Espeseth | G06F 9/522 |

OTHER PUBLICATIONS

NVM Express, NVM Express, Revision 1.3, NVM Express, May 1, 2017, 282 pages.
E. Smith, "Introducing Target Driven Zoning (TDZ)," https://brasstacksblog.typepad.com/brass-tacks/2012/01/introducing-target-driven-zoning-tdz.html, Jan. 16, 2012, 10 pages.
N. Dyer, "NimbleOS 5.2: Simplify Fibre Channel Deployments with Target Driven Zoning (SmartSAN)," https://community.hpe.com/t5/Around-the-Storage-Block/NimbleOS-5-2-Simplify-Fibre-Channel-Deployments-with-Target/ba-p/7090929#.Ydh1DWjMKUk, Jun. 11, 2020, 12 pages.

(Continued)

*Primary Examiner* — Scott C Sun
(74) *Attorney, Agent, or Firm* — Ryan, Mason & Lewis, LLP

(57) ABSTRACT

Techniques are provided for load balancing in a storage system using a storage system-driven host connectivity management process. For example, a load balancing process comprises monitoring a distribution of input/output (I/O) workload across resources of a storage system to detect for an occurrence of an I/O workload imbalance, generating updated connection information for a host system connected to the storage system, in response to detecting the occurrence of an I/O workload imbalance, and sending a request to the host system to discover the updated connection information for connecting to the storage system based on the updated connection information.

20 Claims, 6 Drawing Sheets

(56) References Cited

OTHER PUBLICATIONS

R. Mohan, "Fibre Channel SAN Automation and Orchestration," https://fibrechannel.org/fibre-channel-san- automation-and-orchestration/, Accessed Sep. 14, 2021, 6 pages.

U.S. Appl. No. 17/482,935 filed in the name of Rivka Matosevich et al. on Sep. 23, 2021, and entitled "Generation of Host Connectivity Plans with Load Balancing and Resiliency."

U.S. Appl. No. 17/728,488 filed in the name of Rivka Mayraz Matosevich et al. on Apr. 25, 2022, and entitled "Managing Host Connectivity During Non-Disruptive Migration in a Storage System."

\* cited by examiner

300

LOAD BALANCING USING STORAGE SYSTEM DRIVEN HOST CONNECTIVITY MANAGEMENT

TECHNICAL FIELD

This disclosure relates generally to storage systems and, more specifically, to techniques for load balancing in a storage system.

BACKGROUND

Distributed storage systems are implemented using a plurality of storage systems (e.g., storage server nodes) that are network connected using, e.g., a local area network or a storage fabric. A performance imbalance of input/output (I/O) workloads across resources (e.g., ports, controllers, etc.) of a given storage system can pose significant problems for applications and users. Indeed, such imbalances in I/O workload can generate bottlenecks which limit overall storage system performance and typically result in higher-than-expected response times. Such I/O workload imbalances are caused by various factors, and can dynamically change over time. In this regard, load balancing techniques can be utilized to balance I/O workload in a storage system to achieve increased storage system performance. Such load balancing techniques typically involve manual operations, such as manually changing host connections to storage systems. These manual operations are not only time consuming and tedious, but also error prone.

SUMMARY

Exemplary embodiments of the disclosure include techniques for implementing load balancing in a storage system using a storage system-driven host connectivity management process. In an exemplary embodiment, a load balancing process comprises monitoring a distribution of I/O workload across resources of a storage system to detect for an occurrence of an I/O workload imbalance, generating updated connection information for a host system connected to the storage system in response to detecting the occurrence of an I/O workload imbalance, and sending a request to the host system to discover the updated connection information for connecting to the storage system based on the updated connection information.

Other embodiments of the disclosure include, without limitation, apparatus and articles of manufacture comprising processor-readable storage media, which are configured for implementing load balancing in a storage system using a storage system-driven host connectivity management process.

DETAILED DESCRIPTION

Exemplary embodiments of the disclosure will now be discussed in further detail with regard to systems and methods for implementing load balancing in a storage system using a storage system-driven host connectivity management process. For purposes of illustration, exemplary embodiments will be described herein with reference to exemplary network computing systems, such as distributed storage systems, which implement data processing systems and associated computers, servers, storage devices and other processing devices. It is to be appreciated, however, that these and other embodiments are not restricted to the particular illustrative system and device configurations shown. Accordingly, the term "network computing system" as used herein is intended to be broadly construed, so as to encompass, for example, processing systems comprising cloud computing and storage systems, as well as other types of processing systems comprising various combinations of physical and virtual processing resources. A network computing system may therefore comprise, for example, at least one data center or other cloud-based systems that include one or more cloud systems that host multiple tenants which share cloud resources. Numerous different types of enterprise computing and storage systems are also encompassed by the term "network computing system" as that term is broadly used herein.

Figure 1:
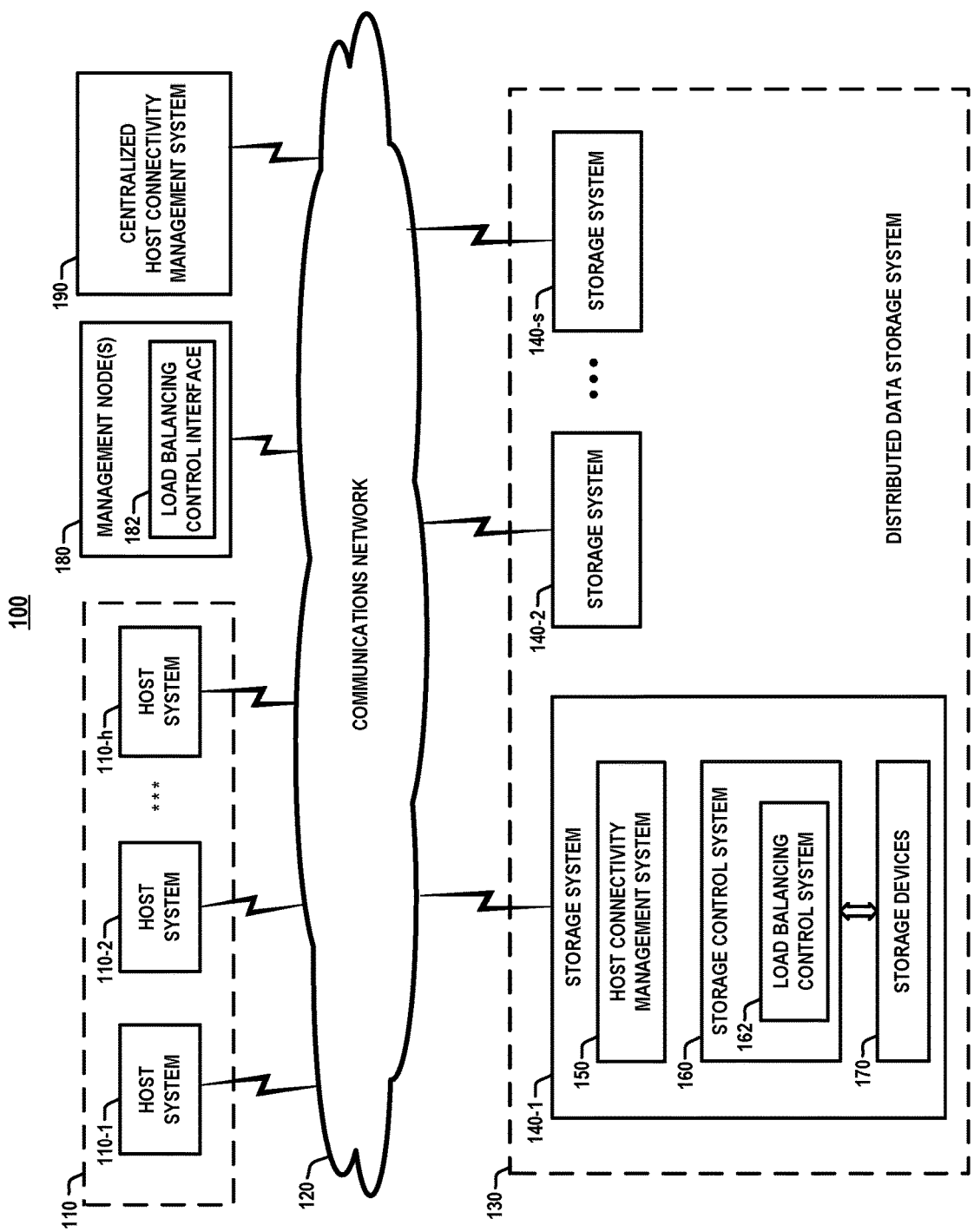
FIG. 1 schematically illustrates a network computing system which is configured to implement load balancing across storage system resources using a storage system-driven host connectivity management process, according to an exemplary embodiment of the disclosure.

FIG. 1 schematically illustrates a network computing system which is configured to implement load balancing across storage system resources using a storage system-driven host connectivity management process, according to an exemplary embodiment of the disclosure. In particular, FIG. 1 schematically illustrates a network computing system 100 which comprises one or more host systems 110-1, 110-2, . . . 110-h (collectively, host systems 110), a communications network 120, and a distributed data storage system 130. The distributed data storage system 130 comprises one or more storage systems 140-1, 140-2, . . . , 140-s (collectively, storage systems 140). As shown in FIG. 1, the storage system 140-1 comprises a host connectivity management system 150 (e.g., comprising a local discovery controller), a storage control system 160, and a plurality of storage devices 170. In some embodiments, each storage control system 160 implements a load balancing control system 162, the functions of which will be explained in further detail below. In some embodiments, the other storage systems 140-2 . . . 140-s have the same or similar configuration as the storage system 140-1 shown in FIG. 1. In addition, the network computing system 100 further comprises one or more management nodes 180, and in some embodiments, a centralized host connectivity management system 190, the functions of which will be explained in further detail below.

The host systems 110 comprise physical server nodes and/or virtual server nodes which host and execute applications that are configured to process data and execute tasks/workloads and perform computational work, either individually, or in a distributed manner, to thereby provide compute services to one or more users (the term "user" herein is intended to be broadly construed so as to encompass numerous arrangements of human, hardware, software or firmware entities, as well as combinations of such entities). In some embodiments, the host systems 110 comprise application servers, database servers, etc. The host systems 110 can include virtual nodes such as virtual machines and container systems. In some embodiments, the host systems 110 comprise a cluster of computing nodes of an enterprise computing system, a cloud-based computing system, or other types of network computing systems or information processing systems comprising multiple computing nodes associated with respective users. The host systems 110 issue data access requests to the distributed data storage system 130, wherein the data access requests include (i) write requests to store data in one or more of the storage systems 140 and (ii) read requests to access data that is stored in one or more of the storage systems 140.

The host systems 110, or applications running on the host systems 110, are configured to access the storage systems 140 through the communications network 120. While the communications network 120 is generically depicted in FIG. 1, it is to be understood that the communications network 120 may comprise any known communications network such as, a global computer network (e.g., the Internet), a wide area network (WAN), a local area network (LAN), a wireless network such as Wi-Fi or WiMAX, a storage fabric (e.g., IP-based or Fibre Channel (FC) storage fabric), or various portions or combinations of these and other types of networks. In this regard, the term "network" as used herein is therefore intended to be broadly construed so as to encompass a wide variety of different network arrangements, including combinations of multiple networks possibly of different types, which enable communication over switched fabric topology using, e.g., Transfer Control Protocol/Internet Protocol (TCP/IP) or other communication protocols such as a Fibre Channel (FC) protocol, a Fibre Channel over Ethernet (FCoE) protocol, a Non-Volatile Memory Express over Fabrics (NVMe-oF) protocol, an Internet Small Computer System Interface (iSCSI) protocol, InfiniBand, Gigabit Ethernet, etc., to implement I/O channels and support storage network connectivity. Numerous alternative networking arrangements are possible in a given embodiment, as will be appreciated by those skilled in the art. For example, in some embodiments, the communications network 120 comprises a converged network comprising a switched fabric IP network comprising LAN switches and storage area network (SAN) switches.

The distributed data storage system 130 may comprise any type of data storage system, or combinations of data storage systems, which comprise software-defined storage, clustered or distributed virtual and/or physical infrastructure. In some embodiments, the distributed data storage system 130 comprises a dynamic scale-out data storage system which allows additional storage systems 140 to be added to scale the performance and storage capacity of the distributed data storage system 130. In some embodiments, each storage system 140 comprises one or more storage arrays, e.g., solid-state drive (SSD) arrays, flash storage arrays, hard-disk drive (HDD) arrays, or combinations thereof. In some embodiments, the storage systems 140 comprise NVMe storage arrays. The storage systems 140 can be configured for block-based storage, file-based storage, or object storage, or a combination thereof. For example, in some embodiments, the storage systems 140 are configured to implement block storage which is accessed using block-based protocols such as FC, FCoE, iSCSI, NVMe, etc. In this regard, the term "storage system" as used herein should be broadly construed and not viewed as being limited to storage systems of any particular type or types.

In some embodiments, each storage system 140 is implemented on a machine, e.g., a physical server machine or storage appliance, which comprises hardware processors, system memory, and other hardware resources that execute software and firmware to implement the functionality of the storage system 140, the host connectivity management system 150, and the storage control system 160. In some embodiments, the storage systems 140 comprise enterprise-class storage systems having multi-controller architectures which execute controller logic. Each storage system 140 executes an operating system (e.g., a customized lightweight Linux kernel), controller logic, and software (e.g., software-defined storage software) to implement various functions of the storage system 140.

The storage devices 170 of the storage systems 140 comprise one or more of various types of storage device such as HDDs, SSDs, Flash memory cards, or other types of non-volatile memory (NVM) devices including, but not limited to, non-volatile random-access memory (NVRAM), phase-change RAM (PC-RAM), magnetic RAM (MRAM), etc. In some embodiments, the storage devices 170 comprise flash memory devices such as NAND flash memory, NOR flash memory, etc. The NAND flash memory can include single-level cell (SLC) devices, multi-level cell (MLC) devices, triple-level cell (TLC) devices, or quad-level cell (QLC) devices. These and various combinations of multiple different types of storage devices 170 may be implemented in each storage system 140. In this regard, the term "storage device" as used herein should be broadly construed to encompass all types of persistent storage media including hybrid drives. On a given storage system 140, the storage control system 160 communicates with the storage devices 170 through any suitable host interface, e.g., a host bus adapter, using suitable protocols such as Advanced Technology Attachment (ATA), serial ATA (SATA), external SATA (eSATA), parallel ATA (PATA), non-volatile memory express (NVMe), SCSI, serial attached SCSI (SAS), peripheral component interconnect express (PCIe), etc.

In some embodiments, the storage control systems 160 of the storage systems 140 are configured to implement various data management services and functions. For example, in some embodiments, the data management services and functions comprise a storage virtualization management system which is configured to create and manage storage volumes by aggregating the capacity of storage devices 170 of a given storage system 140, or multiple storage systems 140, into one or more virtual storage pools from which logical volumes are allocated, wherein the logical volumes (e.g., a block unit of storage management) are identified by, e.g., logical unit numbers (LUNs) that are exposed as block devices to the applications or host systems 110 which consume the data. A given storage volume can be generated which spans across a two or more of the storage systems 140. Furthermore, a virtual block device can correspond to a volume of a storage pool. Each virtual block device comprises any number of actual physical storage devices, wherein each block device is preferably homogeneous in terms of the type of storage devices that make up the block device (e.g., a block device can include only HDD devices or SSD devices, etc.).

Furthermore, the storage control systems 160 are configured to perform various data management and storage services including, but not limited to, inline data compression/decompression, deduplication, thin provisioning, non-disruptive migration of volumes/data, and data protection functions such as data replication, snapshots, Reed-Solomon error correction coding, and other data protection schemes based on data striping and parity (e.g., RAID), and other types of data management functions, depending on the system configuration. Furthermore, in some embodiments, the storage control systems 160 implement non-disruptive migration control systems which comprise methods to support, e.g., non-disruptive migration of volumes or data between the storage systems 140, or migration of volumes or data between storage arrays within a given storage system 140. In some embodiments, a non-disruptive migration system leverages the host connectivity management system 150 to manage and control host connectivity during a non-disruptive migration process, the details of which will be explained in further detail below Furthermore, the load balancing control system 162 on each storage system 140 implements methods to perform load balancing operations to distribute dynamic I/O workload more evenly across resources (e.g., storage system ports, storage system I/O controllers, etc.) of a given storage system 140 and across multiple storage systems 140. For example, in some embodiments, the load balancing control system 162 of a given storage system 140 monitors the I/O workload across the resources (e.g., ports, I/O controllers, etc.) of the given storage system in terms of metrics including, but not limited to, (i) input/output operations per second (TOPS), (ii) I/O bandwidth (e.g., megabytes/second (MB/s), (iii) I/O response time, etc. In certain circumstances, the I/O workload across the ports and controllers of the given storage system can be substantially different, wherein load balancing the IOPS and I/O bandwidth across storage resources (ports and controllers) would result in better performance in terms of TOPS, I/O bandwidth, and I/O response time. In this regard, the load balancing operations are performed to achieve a higher resource utilization ratio within and between storage systems, shorter response times, and high system throughput and bandwidth.

Furthermore, the load balancing control systems 162 are configured to leverage the local host connectivity management systems 150 and/or the centralized host connectivity management system 190 to manage and control host connectivity to achieve load balancing across resources of a given storage system or between resources of multiple storage systems. For example, the load balancing control systems 162 are configured to leverage the local host connectivity management systems 150 and/or the centralized host connectivity management system 190 to automatically achieve load balancing across ports of a given storage system or between multiple storage systems, using techniques as explained in further detail below.

In some embodiments, each storage system 140-1, 140-2, . . . , 140-s utilizes a respective local host connectivity management system 150 to enable the host systems 110 to discover and connect to the storage systems 140-1, 140-2, . . . , 140-s. In some embodiments, each local host connectivity management system 150 comprises a discovery service that implements a local discovery controller to which a given host system 110 can connect to obtain connectivity information that is needed for the given host system 110 to connect to a given storage system 140. In some embodiments, each local host connectivity management system 150 is configured to provide a "referral" to another local host connectivity management system 150 on another storage system 140. An exemplary embodiment of the host connectivity management system 150 will be discussed in further detail below in conjunction with FIG. 2.

The management nodes 180 implement application programming interfaces (APIs) to enable manual, automated, and/or semi-automated configuration, provisioning, and monitoring of the distributed data storage system 130 and the associated storage systems 140. In some embodiments, the management nodes 180 comprise stand-alone dedicated management nodes, which may comprise physical and/or virtual servers. Furthermore, in some embodiments, as shown in FIG. 1, the management nodes 180 implement a load balancing control interface 182 which is used to commence and configure load balancing operations that are performed by the load balancing control systems 162 of the storage systems 140. Furthermore, in some embodiments, the load balancing control interface 182 comprises a centralized load balancing control system which operates in conjunction with the local load balancing control systems 162 that reside on the storage systems 140 to perform load balancing operations.

For example, in some embodiments, the local load balancing control systems 162 of the storage systems are configured to monitor local resources of respective storage systems 140 and perform local intro-storage system load balancing operations. In other embodiments, the centralized load balancing system implemented by the management nodes 180 can be configured to monitor the I/O workload across all the active storage systems 140, determine which storage systems 140 are overloaded relative to other storage systems 140, and initiate load balancing operations to more evenly distribute I/O workload across the storage systems 140. In some embodiments, distributing the I/O workload across the storage systems 140 comprises performing a non-disruptive migration process to migrate one or more volumes or namespaces of a source storage system, which is overloaded/overutilized, to a target storage system which is underutilized.

Furthermore, in some embodiments, the network computing system 100 implements the centralized host connectivity management system 190. The centralized host connectivity management system 190 implements methods that are configured to perform various functions for managing and controlling the connectivity of the host systems 110 to the storage systems 140 of the distributed data storage system 130. In some embodiments, the centralized host connectivity management system 190 comprises a discovery service that implements a centralized discovery controller to which a given host system 110 can connect to obtain connectivity information that is needed for the given host system 110 to connect to one or more of the storage systems 140.

In some embodiments, the centralized host connectivity management system 190 operates in conjunction with the local host connectivity management systems 150 of the storage systems 140, wherein each local host connectivity management system 150 registers with the centralized host connectivity management system 190, and provides discovery information (via a push or pull messing protocol) with regard to the storage systems 140 to enable a centralized discovery system. In this instance, the centralized host connectivity management system 190 aggregates the connectivity information of all the storage systems 140 in the distributed data storage system 130, and allows a given host system 110 to connect to and register with the centralized host connectivity management system 190 to discover the storage systems 140 and obtain information for connecting to one or more of the storage systems 140. In some embodiments, the centralized host connectivity management system 190 executes standalone (e.g., as a virtual machine) on one or more server nodes apart from the one or more management nodes 180. In some, the centralized host connectivity management system 190 is a software-based entity that runs as a virtual machine or as an embedded container on a fabric.

Figure 2:
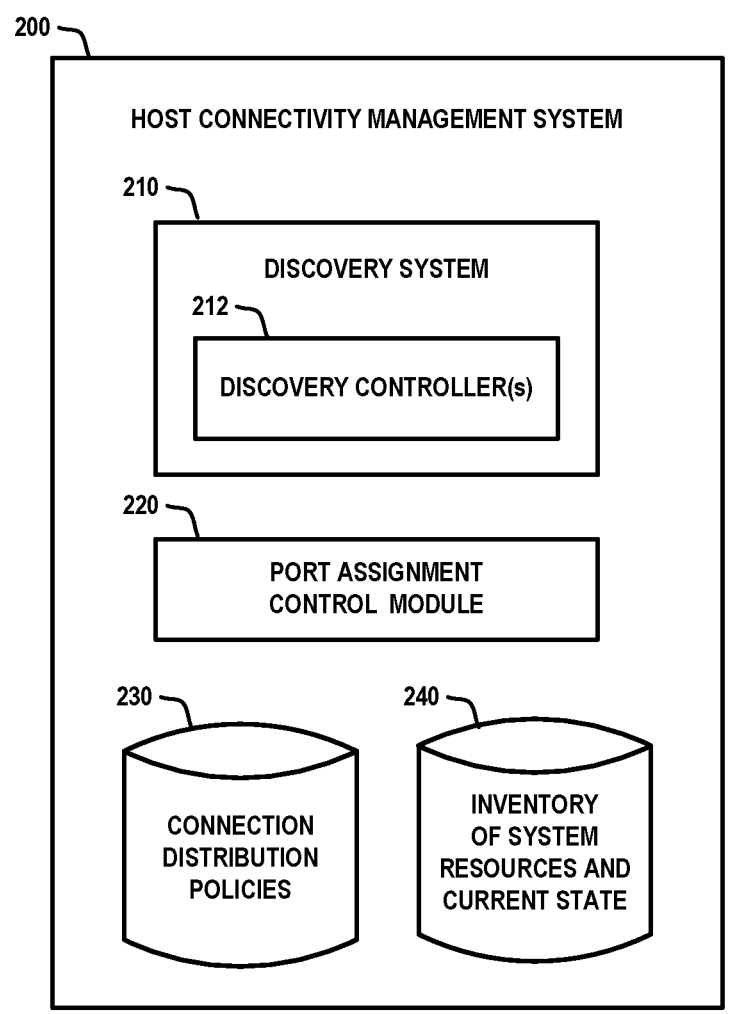
FIG. 2 schematically illustrates a host connectivity management system which is utilized to support load balancing across storage system resources, according to an exemplary embodiment of the disclosure.

FIG. 2 schematically illustrates a host connectivity management system which is utilized to support load balancing across storage system resources, according to an exemplary embodiment of the disclosure. More specifically, FIG. 2 schematically illustrates a host connectivity management system 200 comprising a discovery system 210, a port assignment control module 220, a datastore of connection distribution policies 230, and a datastore of information regarding a current inventory of storage system resources and a current state of such resources 240. In some embodiments, the host connectivity management system 200 illustrates an exemplary configuration of the local host connectivity management systems 150 which reside on the storage systems 140 (FIG. 1) or the centralized host connectivity management system 190.

The discovery system 210 implements a discovery service that is configured to discover constituent logical and physical elements of the storage environment and a current configuration of such discovered elements. The discovery system 210 is configured to provision one or more discovery controllers 212 to which hosts are connected to discover information that is utilized by the hosts to connect to storage systems in the data storage system. In some embodiments, the host connectivity management system 200 and associated discovery system 210 are configured as a target endpoint which is assigned to a specific IP address and port which allows the host systems to connect to the host connectivity management system 200. The discovery system 210 can be implemented using dynamic discovery services including, but not limited to, an NVMe-oF discovery protocol, an iSCSI SendTargets discovery protocol, a Fibre Channel Target Driven Zoning protocol, etc., depending on the given storage system environments. In other embodiments, control path methods can be implemented to allow the host system to communicate with the host connectivity management system 200 and obtain the port assignment and connection information through a control interface such as command-line interface (CLI). In such embodiments, the connection information is transferred to the host systems through some mechanism such as manually or through an orchestration infrastructure.

The various functions of the discovery system 210 will vary depending on whether the host connectivity management system 200 is a local system that resides on a storage system, or a centralized system that resides, e.g., in a switch or node in the storage fabric. For example, if the host connectivity management system 200 is a local system that resides on a given storage system, the discovery system 210 will track a current state and configuration of the given storage system, as well as port connectivity information (e.g., allocated I/O controllers, available volumes/namespaces, ports IDs of used and available ports for connecting to the storage system, etc.), and maintain such information in the datastore 240. On the other hand, if the host connectivity management system 200 is a centralized system, the discovery system 210 is configured to obtain or otherwise discover information regarding the hosts and storage systems connected to a given storage fabric within the storage environment.

More specifically, a centralized discovery service allows a host to automatically determine which storage systems on the storage fabric the host can access. The centralized discovery service allows a host to discover a list of storage systems (e.g., NVMe subsystems) with volumes/namespaces that are accessible to the host, allows the storage systems to discover a list of hosts that are on the storage fabric, allows a host to discover multiple paths to given storage system, etc. The centralized discovery service maintains a discovery log that collects data about the hosts and subsystems on the storage fabric, and provides a single point of contact for hosts and storage systems to utilize to discover each other on the storage fabric. The hosts and storage systems can be configured to access an IP address of the centralized discovery service, and the centralized discovery service serves as a broker for the communication between the hosts and storage systems.

In some embodiments, the centralized discovery system communicates with the local discovery systems of the storage systems (via a push or pull messaging mechanism) on a periodic or continuous basis to determine information such as a current inventory of available resources, the current operational states of the storage systems (active, inactive, failed, etc.), the I/O workload on the storage systems, the type of I/O workload on the storage systems (e.g., read intensive workloads, or write intensive workloads), the number of host system connections to each of the ports of the storage systems, etc. In some embodiments, depending on the type of storage environment and associated architecture, the centralized discovery service is configured to automatically discover elements such as, e.g., initiator endpoints (e.g., host systems such as application servers, etc.), target endpoints (e.g., storage nodes, storage controller nodes, namespaces, volumes, etc.), elements of a storage fabric (e.g., fabric infrastructure such as switches, ports, etc.), and a current configuration of such elements. For example, for initiator endpoints (e.g., host systems) and target endpoints (e.g., storage node), the configuration information can include an endpoint identifier and type (e.g., application server, storage system), the transport protocol information (e.g., protocol type, address, etc.), fabric port (e.g., Ethernet interface), and a fabric address (e.g., IP address, logical port, etc.). For storage fabric elements, the configuration information can include information such as fabric type (port-based fabric, addressable fabric, etc.) and other relevant configuration information with regard to, e.g., components of the storage fabric (e.g., fabric infrastructure such as switches, ports, etc.). The centralized discovery service maintains and continually updates an inventory of the discovered storage system resources in the datastore 240.

The port assignment control module 220 implements methods that are configured to determine a recommended connection (e.g., a subset of ports) for a given host system based on various criteria including, but not limited to, a current state of the system resources, a current or updated inventory of system resources (as maintained in datastore 240) and one or more connection distribution policies (as maintained in datastore 230). The information regarding a current state of the system resources includes, but is not limited to, the available storage systems and their current state, the I/O workload experienced by the storage systems (current workload or historically), the current state of port connectivity of host systems to the storage systems, the I/O workload (currently or historically) associated with data access requests from the host systems, etc.

In the context of exemplary load balancing operations as discussed herein, the port assignment control module 220, of the host connectivity management system 200 is configured to receive host connectivity information from a load balancing control system with regard to port re-assignments of connected host systems, which are currently connected to a given storage system, and provide such information to the host system through the discovery system 210 to achieve load balancing across the ports of the storage system. In this regard, the load balancing control systems 162 are configured to address dynamic changes in I/O workload which occur in one or more storage systems during period of time following the initial connection of host systems to the storage systems.

In some embodiments, the connection distribution policies specify criteria for distributing the host system connections to the available ports of the storage systems. For example, a connection distribution policy may specify that there be an equal distribution of host system connections over the storage systems of the distributed storage system. For example, the connection distribution policy can specify a port assignment which provides an equal distribution of host system connections over the storage systems and the ports of the storage systems. Another connection distribution policy may specify that the host system connections are distributed in proportion to some system resource, e.g., CPU, memory, network, etc. Another connection distribution policy may specify a distribution which achieves an equal distribution of an average I/O workload of the host systems over the storage systems. Another connection distribution policy may specify that a distribution which achieves a distribution of the average I/O workload of the host systems in proportion to some system resource, e.g., processor resources (e.g., CPUs), memory resources, network resources, etc.

In the context of exemplary load balancing operations as discussed herein, as noted above, the load balancing control systems 162 are configured to address dynamic changes in I/O workload which occur in one or more storage systems during a period of time following the initial connection of host systems to the storage systems. On the other hand, when a given host system initially connects to one or more storage systems, the port assignment control module 220 utilizes the connection distribution policies (as maintained in datastore 230) and the inventory of system resources and current state (as maintained in datastore 240) to determine a subset of ports (among all the available ports of the storage systems in the data storage system) to assign to the host system and allow the host system to connect to the one or more storage systems using some or all of the assigned ports. The port assignment control module 220 provides the recommended connectivity for a given host system to the discovery system 210, and the discovery system 210 provides the recommended connection information to the host system. The recommended connectivity (e.g., number of ports) may be different between different host systems depending on the specific requirements of the host systems (e.g., I/O throughput), and a new recommended connectivity may be provided to a given host system in response to a change in the requirements of the host system. However, as noted above, in the context of exemplary load balancing operations as discussed herein, the host connectivity management system 200 is configured to provide updated host connection information to host systems (which are currently connected to a given storage system) through the discovery controllers 212 to achieve load balancing across the ports of the given storage system.

With this scheme, a host system does not need knowledge on how to connect, or otherwise need to determine how to connect, to a given storage system either initially or subsequently for load balancing. Instead, the recommended connection information that is returned to the host system from the host connectivity management system 200 specifies how the host system should connect to the data storage system. This is in contrast to conventional schemes in which the host system (e.g., application server), through a discovery request, is provided a list of all available ports and paths to all storage volumes in a data storage system, where the host system is required to determine which ports and paths to use for connection to the data storage system and storage volumes of the storage nodes. The exemplary embodiments of the disclosure as described herein limit the returned paths to a set that the host system should use, thereby removing the dependency on the host system having to handle the returned path list.

In some embodiments, the host system connection to the discovery system 210 is a temporary connection whereby the host system disconnects from the discovery system 210 after receiving connectivity information. In other embodiments, a persistent discovery controller mechanism is implemented in which the host system maintains a persistent connection with a discovery controller 212 of the discovery system 210 after receiving the initial connectivity information and while the host system is connected to the storage system. The persistent connection allows the discovery system 210 to push notifications to the host system when certain events occur, e.g., when there are changes in the system resources and/or state (e.g., storage node(s) added/removed/failed, changes in fabric configuration, etc.). For example, in the context of NVMe-oF, a persistent discovery controller can be configured to send an asynchronous event notification (AEN) to a host system connected to the persistent discovery controller to provide notification of such events. In response to receiving such notifications, the host system can issue new discovery requests to obtain updated connection information (e.g., updated port assignments) as desired. Moreover, in the context of load balancing operations and non-disruptive migration, the persistent connection allows the host connectivity management system 200 to push updated connection information to a given host system to allow the host to change the port connections to a given storage system for load balancing purposes, or otherwise connect to one or more ports of a target storage system and disconnect from one or more ports of a source storage system, and thereby automate and control host connectivity for automated load balancing operations and performing non-disruptive migration operations.

Figure 3:
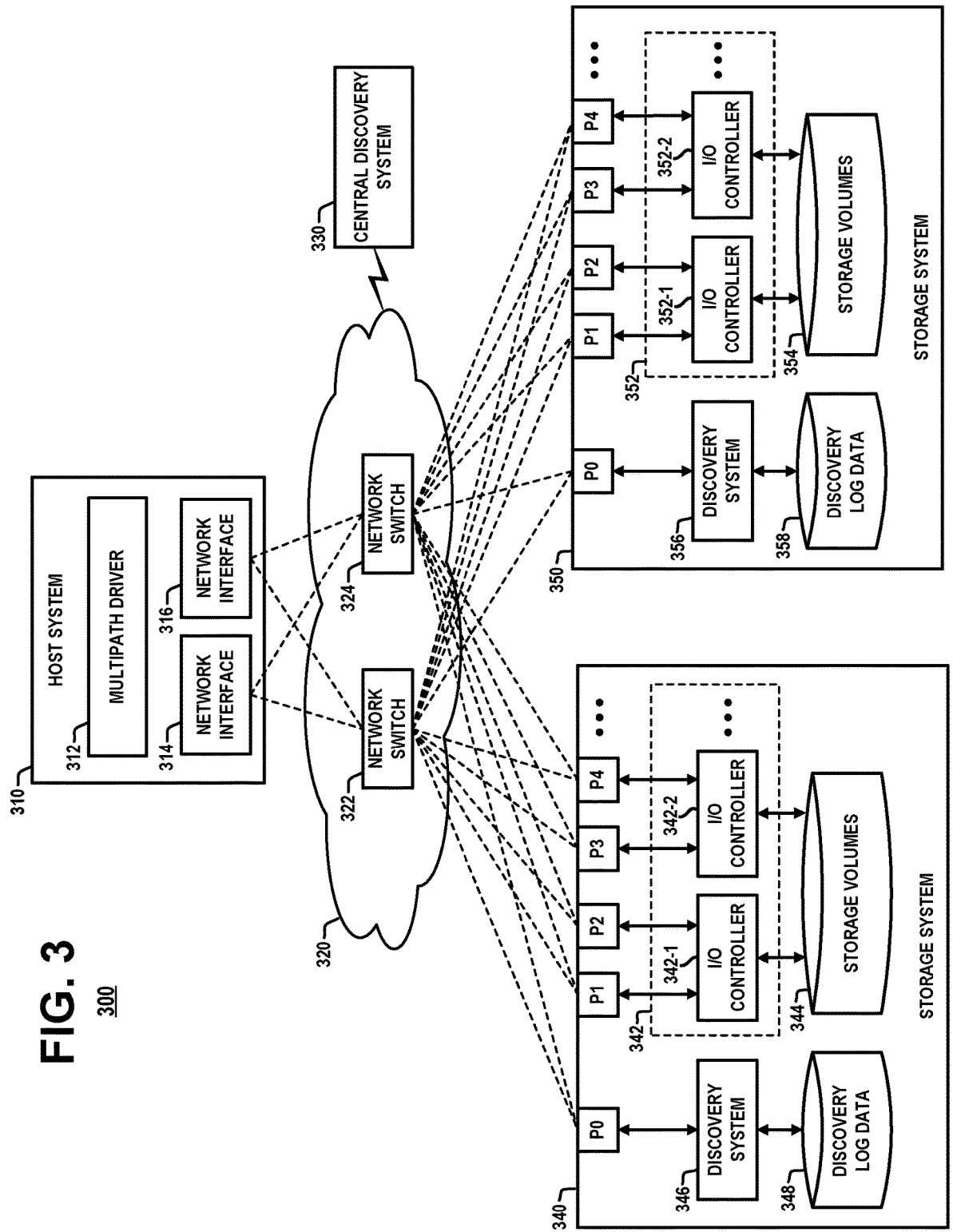
FIG. 3 schematically illustrates a network computing system which is configured to provide load balancing across storage system resources using a storage system-driven host connectivity management process, according to another exemplary embodiment of the disclosure.

FIG. 3 schematically illustrates a network computing system which is configured to provide load balancing across storage system resources using a storage system-driven host connectivity management process, according to another exemplary embodiment of the disclosure. In particular, FIG. 3 schematically illustrates a network computing environment 300 comprising a host system 310, a storage network 320 comprising network switches 322 and 324, a central discovery system 330, and storage systems 340 and 350. The host system 310 comprises a multipath driver 312 and network interfaces 314 and 316 (providing two ports). The storage system 340 comprises a plurality of ports P0, P1, P2, P3, and P4, a plurality of I/O controllers 342 (including at least a first I/O controller 342-1, and a second I/O controller 342-2), storage volumes 344 that are logically configured on non-volatile storage media of the storage system 340, a local discovery system 346 which maintains and utilizes discovery log data 348 regarding a current operating state and connectivity information of the storage system 340. The storage system 350 comprises a plurality of ports P0, P1, P2, P3, and P4, a plurality of I/O controllers 352 (including at least a first I/O controller 352-1, and a second I/O controller 352-2), storage volumes 354 that are logically configured on non-volatile storage media of the storage system 350, a local discovery system 356 which maintains and utilizes discovery log data 358 regarding a current operating state and connectivity information of the storage system 350.

On the host system 310, the multipath driver 312 controls multipath access of the host system 310 to the storage systems 340 and 350 using known methods. For example, the multipath driver 312 is configured to direct I/Os through the volume paths, automatically identify redundant I/O paths, and automatically reroute I/Os to an alternate path when, e.g., a storage controller or storage node fails or all data paths to a given storage system or storage controller fail. In addition, the multipath driver 312 checks the status of known paths to a given storage volume, and provides load balancing of I/O requests between the available paths. In this regard, the multipath driver 312 manages the paths from the host system 310 to volumes on storage systems 340 and 350 through specific host ports and the storage ports specified or otherwise assigned to the host system 310 by the local discovery systems 346 and 356 and/or the central discovery system 330. The host system 310 manages the connections between a host port and a storage port, where the host system 310 obtains a list of storage ports through, e.g., discovery, and then connects to one or more of the storage ports obtained through discovery.

The network interfaces 314 and 316 of the host system 310 can be implemented using various types of adaptors that are commonly used in computer or storage networks to connect a host system to storage and/or network devices, depending on the storage environment. For example, network interfaces 314 and 316 may comprise host bus adapters (HBAs), network interface cards (NICs), converged network adaptors (CNAs), etc. An HBA enables I/O processing and provides physical connection between the host system and storage or network devices (e.g., network switches 322 and 324) in a SAN environment. The HBA can be utilized for Fibre Channel and iSCSI protocol enabled connections. An NIC can be used for an Ethernet-based network environment. A CNA converges the functions of an HBA with NIC in a single adaptor.

On the storage system 340, the port P0 is utilized by the host system 310 to connect to the local discovery system 346 (e.g., discovery subsystem) and associated discovery controller (e.g., persistent discovery controller) and obtain connection information for connecting to one or more ports P1, P2, P3, P4, etc., to access one or more storage volumes 344 through one or more allocated I/O controllers 342. Similarly, on the storage system 350, the port P0 is utilized by the host system 310 to connect to the local discovery system 356 (e.g., discovery subsystem) and associated discovery controller (e.g., persistent discovery controller) and obtain connection information for connecting to one or more ports P1, P2, P3, P4, etc., to access one or more storage volumes 354 through one or more allocated I/O controllers 352.

In some embodiments, in the context of NVMe, in response to receiving a discovery request (e.g., Get Log Page command) from the host system 310, the discovery system 346 will access the discovery log data 348 and return discovery log data to the host system 310 in a Discovery Log Page. The Discovery Log Page provides specific information regarding the current resources of the storage system 340 (e.g., NVMe subsystems) and storage endpoints (ports) to which the host system 310 can access to connect to one or more I/O controllers 342 using a connect command. For example, a Discovery Log Page comprises information including, but not limited to, NVMe transport type (e.g., RDMA, for FC, TCP), address family (e.g., IPv4, IPv6, InfiniBand, FC), one or more Port IDs, Transport Address (address for a connect command), etc. Similarly, in response to receiving a discovery request (e.g., Get Log Page command) from the host system 310, the discovery system 356 will access the discovery log data 358 and return discovery log data to the host system 310 in a Discovery Log Page.

For ease of illustration and explanation, the storage systems 340 and 350 are shown to have at least five ports P0, P1, P2, P3, and P4, and at least two I/O controllers, with the ports P1, P2, P3, and P4 coupled to the I/O controllers. However, each storage system 340 and 350 may have any number of ports, e.g., 2 ports, 8 ports, 16 ports, etc. In some embodiments, each port is associated with at least one I/O controller of the storage system. In other embodiments, each I/O controller of a given storage system is associated with groups of two or more ports. Moreover, in some embodiments the I/O controllers of a given storage system can share a given port of the given storage system.

FIG. 3 schematically illustrates a fabric connect configuration, wherein the host system 310 can have at least two connections to each network switch 322 and 324, and wherein each network switch 322 and 324 can connect to each port P0, P1, P2, P3 and P4 of each storage system 340 and 350. In this configuration, there exists multiple physical paths through which the host system 310 can connect to each storage system 340 and 350, where all available paths are depicted in FIG. 3 as dashed lines. However, as noted above, the host connectivity management systems of the storage systems 340 and 350 are configured to control the connectivity of the host system 310 to the storage systems 340 and 350. For example, the host connectivity management systems of the storage systems 340 and 350 utilize control logic (e.g., port assignment control module 220, FIG. 2) to determine which system ports the host system 310 should connect to, and then utilize the discovery system (e.g., NVMe discovery protocol) to provide the host system 310 with a list of those system ports. The host system 310 connects to the storage system ports reported in the discovery log page, and disconnect from storage system ports that are not listed in the discovery log page.

While FIG. 3 depicts a single host system 310 for ease of illustration and explanation, it is to be understood that many host systems can be concurrently connected to one or both of the storage systems 340 and 350, causing an I/O workload imbalance across the resources (e.g., ports, I/O controllers, etc.) of the storage systems 340 and 350. For example, a subset of the I/O ports P1, P2, P3, P4, . . . , etc. of the storage system 340 may reach their TOPS or I/O bandwidth limit, while other ports may have plenty of available performance capacity. The imbalance may also be experienced at the level of the I/O controllers 342, wherein some I/O controllers have a maximum I/O workload, while other I/O controllers are underutilized. Such dynamic imbalance-driven bottlenecks limit overall storage system performance and typically result in higher-than-expected response times. The imbalance may be caused by several factors, including, but not limited to, (i) user carelessness in mapping to applications/ servers to the storage resources to balance the I/O workload, (ii) applications changing their actively (e.g., previously inactive applications/servers becoming more active, or previously active applications/servers becoming less active, or applications/servers being added or removed from the storage system), (iii) migrations of workloads between storage systems, (iv) new resources (e.g., I/O controllers) being added to a given storage system, etc. In such instances, the I/O workload across the ports and I/O controllers of a given storage system can dynamically change over time, causing I/O workload imbalances. In this regard, balancing the IOPS and I/O bandwidth across the storage resources (ports and I/O controllers) would result in better performance in terms of TOPS, I/O bandwidth, and I/O response time.

Figure 4:
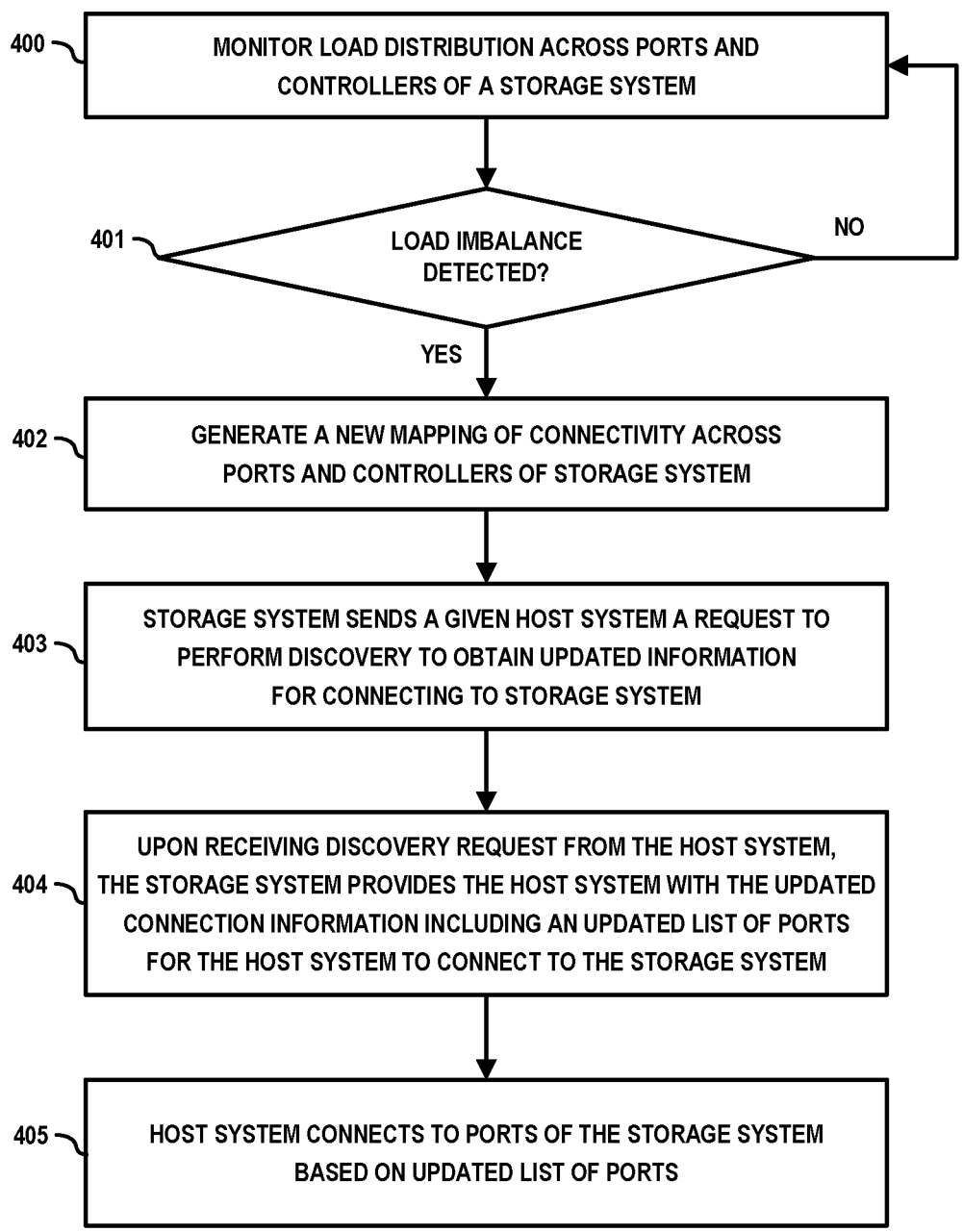
FIG. 4 illustrates a flow diagram of a method for load balancing across storage system resources using a storage system-driven host connectivity management process, according to an exemplary embodiment of the disclosure.

FIG. 4 illustrates a flow diagram of a method for load balancing storage system resources using a storage system-driven host connectivity management process, according to an exemplary embodiment of the disclosure. In particular, FIG. 4 illustrates a method for automatically achieving load balancing across the ports of a given storage system using a storage system driven host connectivity management. In some embodiments, FIG. 4 illustrates exemplary modes of operation of the host connectivity management system 150 and the load balancing control system 162 of a given storage system 140, as shown in FIG. 1.

A given storage system monitors (e.g., via a local load balancing control system) a load distribution across resources (e.g., ports and I/O controllers) of the given storage system (block 400). For example, in some embodiments, the load balancing control system monitors the I/O workload across the storage system resources in terms of metrics including, but not limited to, IOPS, I/O bandwidth (e.g., megabytes/second (MB/s), I/O response time, etc. As noted above, in certain circumstances, the I/O workload across the ports and controllers of the storage system can be substantially different, wherein balancing the IOPS and I/O bandwidth across storage resources (ports and controllers) would result in better performance in terms of TOPS, I/O bandwidth, and I/O response time.

The load balancing control system utilizes the monitored I/O workload information across the storage system resources (e.g., ports and controllers) to determine if there is a load imbalance across the storage system resources (block 401). When a persistent, non-transitory I/O workload load imbalance is detected for the given storage system (affirmative determination in block 401), the load balancing control system will commence a load balancing process to generate a new mapping of connectivity across the ports and/or I/O controllers of the storage system (block 402). The load balancing process can be implemented using any load balancing algorithm which is suitable and applicable to the given type of connectivity and communication protocols (e.g., NVMe/TCP) and subsystem driven host connectivity management.

For example, in some embodiments, a load balancing process is configured to initially distribute available storage system resources to the host systems which are the largest consumers of the storage system resources, and then distribute the available storage system resources to the remaining hosts system (which are smaller consumers of the storage system resources) in a manner which minimizes a mean square error function that represents the difference among the ports and/or I/O controllers of the storage system. In all instances, the load balancing control system is configured to distribute the dynamic I/O workload evenly across all the storage system resources to achieve, e.g., a high resource utilization ratio, short response time and high throughput, and overall balanced I/O workload across the storage system resources. In some embodiments, the load balancing control system maintains high-availability and redundancy characteristics, e.g., if a given volume or namespace is previously mapped to four (4) ports and four (4) I/O controllers, the new mapping will also be the same.

Once the new mappings are generated by the load balancing control system, the source storage system proceeds to utilize the host connectivity management system to automate the host connectivity to the storage system. More specifically, in some embodiments, as an initial step, the storage system sends a given host system a request to perform discovery to obtain updated information for connecting to the storage system (block 403). For example, in some embodiments, for NVMe, the storage system sends the given host system a request to read an updated NVMe discovery log page. More specifically, in some embodiments, when the host system remains connected to the local discovery system of the storage system using a persistent discovery controller, the storage system can send an asynchronous event request to the host system indicating a change in the discovery information. In other embodiments, the storage system can send a notification message (e.g., alert message) to the host system requesting a manual rediscovery operation to be triggered on the host system.

In response to the request (e.g., asynchronous event request), the host system will send a discovery request to the storage system to obtain the updated discovery information (e.g., updated connection information.) In some embodiments, for an NVMe-oF storage system, the host system can send a "Get Log Page" request to the discovery system of the storage system. In other embodiments, for an iSCSI storage system, the host can send a "SendTargets" request to the discovery system of the storage system. Upon receiving the discovery request from the host system, the storage system (via the local discovery system on the storage system) will send a response message to the host system which comprises updated connection information including an updated list of ports for the host system to connect to the storage system (block 404). For example, for NVMe-oF, the local discovery system of the storage system will return a discovery log page to the host system, which comprises the updated connection information.

In some embodiments, the host system automatically connects to the ports reported in the returned response message (block 405). In addition, I/O controller initialization and connection operations are performed to connect the host system to one or more I/O controllers as determined based on the load balancing process. It is to be noted that in some instances, the host system may already be connected to one or more ports listed in the updated connection information. In such instances, the host system remains connected to such ports. Further, the host system will automatically disconnect from any port which is not included in the list of ports in the updated connection information, and will automatically connect to one or more ports listed in in the updated connection information which the host system is not already connected to.

It is to be noted that the automated host connectivity process will vary depending on, e.g., the discovery service configuration of the storage system (e.g., local discovery controllers and/or central discovery controller), and other system configurations. Moreover, in the exemplary embodiment of FIG. 4, is it assumed that the load balancing and host connectivity is an automated process which is performed and executed without explicit user intervention. In other embodiments, the process can be configured to enable user intervention at some stage of the process (after the new mappings are generated in block 402, where the process can be interrupted to send a notification to a user or administrator, where such notification provides information with regard to, e.g., the current and new port assignment, and expected performance benefits, etc.

It is to be noted that FIG. 4 illustrates an exemplary process flow for load balancing I/O workload across the resources of a given storage system (e.g., intra storage system load balancing). In other embodiments, load balancing of I/O workloads may involve migrating a given volume or namespace from source storage system to a target storage system in a non-disruptive manner (inter storage system load balancing). A non-disruptive migration process allows on-line data migrations which are non-disruptive to a given host system, e.g., the non-disruptive migration of a given volume from a source storage system to a target storage system avoids disruption in application input/output (I/O) operations to the migrating volume by exposing an identity of the migrating volume through both the source and target storage systems.

There can be circumstances in which the resources (e.g., ports, controllers) of a given storage system (source storage system) are relatively overloaded as compared to the resources of another storage system (target storage system) which are underutilized. In this instance, an automated load balancing process can be implemented by migrating one or more volumes from the source storage system to the target storage system using a non-disruptive migration process in which a storage system-driven host connectivity management process is utilized to control host connections to source and target storage systems during the non-disruptive migration process to avoid disruption in the I/O operations to the migrating volume by the source storage system.

Figure 5:
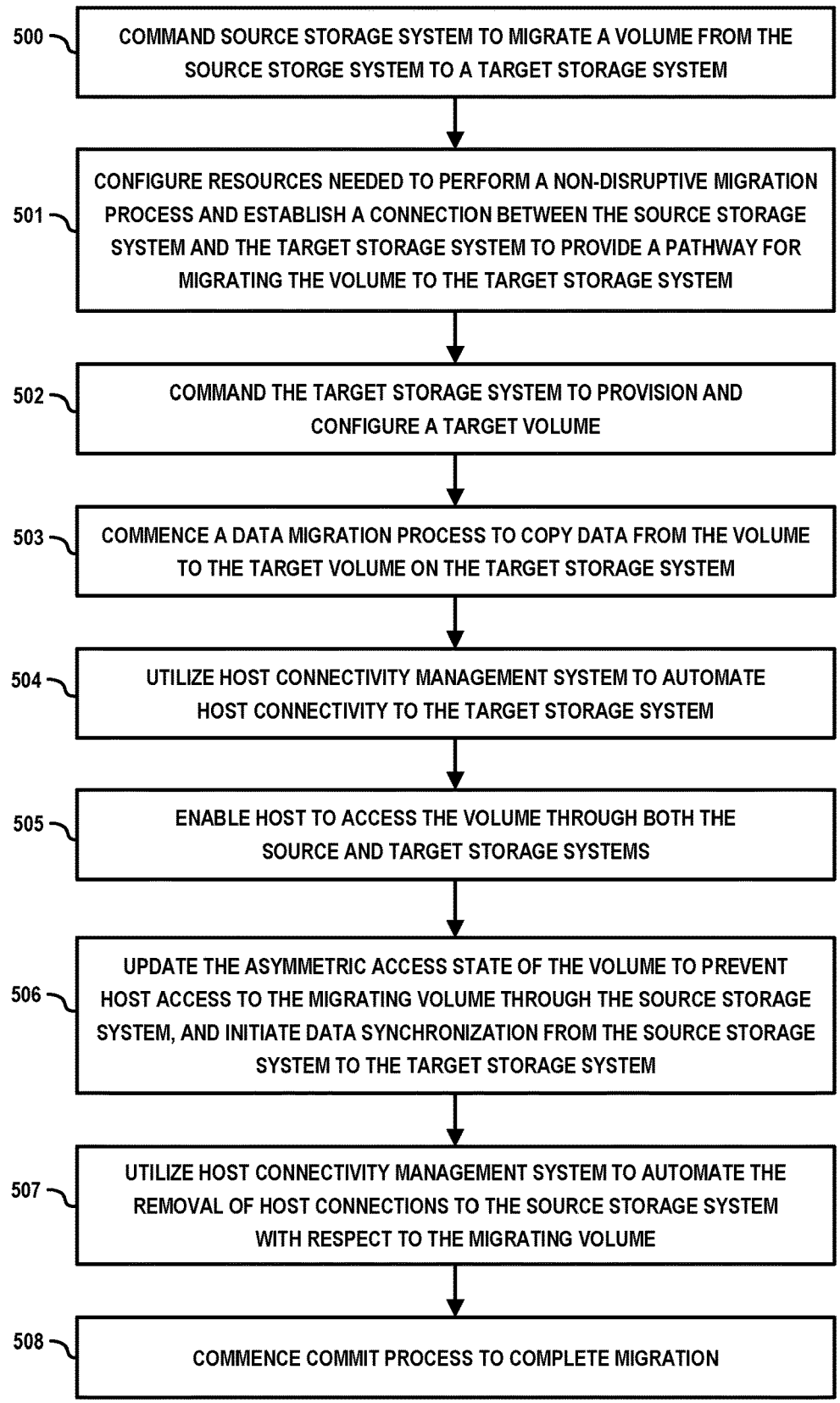
FIG. 5 illustrates a flow diagram of a method for load balancing across storage system resources using a storage system-driven host connectivity management process, according to another exemplary embodiment of the disclosure.

FIG. 5 illustrates a flow diagram of a method for load balancing storage system resources using a storage system-driven host connectivity management process, according to an exemplary embodiment of the disclosure. In particular, FIG. 5 illustrates a load balancing method which involves performing a non-disruptive migration process in which a host connectivity management system is utilized to automatically manage host connections to source and target storage systems as part of the non-disruptive migration process, according to an exemplary embodiment of the disclosure. In the process flow of FIG. 5, it is assumed that a load balancing control module (e.g., local or centralized load balancing control module) determines that the source storage system is overloaded, and that that target storage system is underutilized, and that migrating one or more volumes from the source storage system to the target storage system will provide sufficient inter-storage system load balancing. In addition, it assumed that a given host system is connected to the source storage system and is accessing a given volume of the source storage system, which is selected for migration. In this instance, the load balancing control system commands the source storage system to migrate a given volume (source volume) from the source storage system to the target storage system (block 500). For example, in some embodiments, a non-disruptive data migration system (operating on the source storage system) receives a migration request which is automatically issued by the load balancing control system. In other embodiments, the migration request can be manually issued by an administrator (e.g., via the load balancing control interface 182, FIG. 1).

In response to the migration request, the source storage system (via operation of a non-disruptive data migration system) configures the resources needed to perform the non-disruptive migration process and to establish a connection between the source storage system and the target storage system to provide a pathway for migrating the source volume to the target storage system (block 501). For the configuration process, it is assumed that the source and target storage systems are configured to support non-disruptive migration operations and that useable pathway for data migration is available between the source and target storage systems. The type of connection between the source and target systems will vary depending on, e.g., the location of the source and target storage systems (e.g., whether the source and target storage systems are located on a same storage network in same data center or local computing system, or remotely located in different data centers or different computing systems, remote from each other, etc.).

The source storage system commands the target storage system to create a target volume on the target storage system (block 502). For example, in some embodiments, the non-disruptive migration system (executing on the source storage system) determines the storage configuration of the source volume on the source storage system, and then commands the non-disruptive migration system (executing on the target storage system) to provision an equivalent configuration of a target volume on the target storage system. Next, the source storage system commences a data migration process to copy the data of the source volume to the target volume on the target storage system (block 503).

The source storage system then proceeds to utilize the host connectivity management system to automate the host connectivity to the target storage system (block 504). The automated host connectivity process is commenced either during the data copy process, or after the data has been copied from the source volume to the target volume. The automated host connectivity process will vary depending on, e.g., the discovery service configuration of the storage system (e.g., local discovery controllers and/or central discovery controller), and other system configurations. The process for connecting the host system to the target storage system can be implemented using different techniques.

For example, in some embodiments, as an initial step, the source storage system sends the host system a request to perform discovery to obtain information for connecting to the target storage system. For example, in some embodiments, for NVMe, the source storage system sends the host a request to read an updated NVMe discovery log page. More specifically, in some embodiments, when the host remains connected to the local discovery system of the source storage system using a persistent discovery controller, the source storage system can send an asynchronous event request to the host indicating a change in the discovery information. In other embodiments, the source storage system can send a notification message (e.g., alert message) to the host requesting a manual rediscovery operation to be triggered on the host.

In response to the request, the host will send a discovery request to the source storage system to allow the host to discover one or more paths to the target volume on the target storage system. In some embodiments, for an NVMe-oF storage system, the host can send a "Get Log Page" request to the discovery system of the source storage system. In other embodiments, for an iSCSI storage system, the host can send a "SendTargets" request to the discovery system of the source storage system. Upon receiving the discovery request from the host, the source storage system (via the local discovery system on the source storage system) will respond by providing the host a referral to a discovery system associated with the target storage system. For example, in some embodiments, the source storage system will send the host a referral to the local discovery system of the target storage system. In this instance, the host is expected to follow the referral provided in the response message (e.g., the discovery log page (for NVMe-oF), the SendTargets response message (or iSCSI), etc.) and connect to the discovery system of the target storage system.

The host will connect to the discovery system of the target storage system to obtain connectivity information for connecting to one or more ports of the target storage system to access the migrating volume on the target storage system. For example, for NVMe-oF, when the host connects to the local discovery system of the target storage system, the discovery system of the target storage system will return a response message (e.g., discovery log page, etc.) to the host, wherein the response message comprises a list of one or more ports of the target storage system to which the host should connect to perform I/O to the migrating volume. The host connects to the ports reported in the returned response message. It is to be noted that in some instances, the host may already be connected to the target storage system for accessing other volumes. In this regard, it is possible that no change in the host connectivity to the target storage system is needed for the host to access the migrating volume. The automated connection process is deemed complete when the source storage system verifies that the host is connected to the target storage system.

In other embodiments, an automated process for enabling the host to connect to the target storage system during the non-disruptive migration process is implemented as follows. As an initial step, the source storage system sends a request to the target storage system to provide a list of ports to which the host should connect to access the migrating volume. For example, in some embodiments, the local discovery system of the source storage system sends a request to the local discovery system of the target storage system requesting such connection information. The target storage system sends the source storage system a response message which includes the connection information (e.g., list of ports on the target storage system), and the discovery system of the source storage system sends the host a request to perform discovery to obtain information for connecting to the target storage system. For example, in some embodiments, the source storage system sends the host a request to read an updated NVMe discovery log page. Further, in some embodiments, when the host remains connected to the local discovery system of the source storage system using a persistent discovery controller, the source storage system can send an asynchronous event request to the host indicating a change in the discovery information. In other embodiments, the source storage system can send a notification message (e.g., alert message) to the host requesting a manual rediscovery operation to be triggered on the host.

In response to the request, the host will send a discovery request (e.g., "Get Log Page" request, "SendTargets" request, etc.) to the source storage system to allow the host to discover one or more paths to the target volume on the target storage system. Upon receiving the discovery request from the host, the source storage system (via the local discovery system on the source storage system) responds to the host by providing connection information which includes both the source system ports to which the host is connected and the list of target ports of the target storage system that were obtained from the discovery system of the target storage system, and the host utilizes the connection information to connect to the target storage system to access the migrating volume through the target storage system. The target storage system reports to the source storage system when the host is successfully connected to an I/O controller of the target storage system, which allows the source storage system to verify that the host is connected to the target storage system.

Once the source storage system confirms that the host is connected to the target storage system, a process is performed to enable host access to the migrating volume through both the source and target storage systems (block 505). For example, in some embodiments, the source storage system transmits a "reservation" to the target storage system to set a reservation on the target volume. For example, in some embodiments, the reservation comprises an NVMe reservation, a SCSI reservation, an SCSI-3 persistent reservation, or other types of similar protocols that are suitable for the given application and storage environment. In all instances, the reservation is used to control host access to a given volume or namespace, etc. An NVMe reservation or SCSI-3 persistent reservation on a given volume or namespace restricts host access to the given volume or namespace. An NVMe reservation requires an association between a host ID and a given volume ID or namespace ID. A host may be associated with multiple I/O controllers by registering the same Host ID with each controller it is associated with. A host ID allows the storage system to identify I/O controllers associated with the host having said host ID and preserve reservation properties across these controllers.

After setting the reservation(s), the identity of the target volume is set to the identity of the source volume, and the target storage system exposes the migrating volume to the host system. At this point, the host system has access to the volume through both the source storage system and the target storage system. Until the data migration is completed, data consistency is ensured because the data remains in the source volume for consolidated management after the connection between the source volume and the host is disconnected. For example, I/O issued by the host will be directed to either the source storage system or the target storage system through multi-pathing software of the host, but the system will ensure that all I/Os that are directed to the target storage system by the host are actually serviced by the source storage system until a migration "cleanup" process (or cutover process) is initiated.

In some embodiments, as part of a migration cleanup process, the source and target storage systems update the asymmetric access state of the volume to prevent host access to the migrating volume through the source storage system, and initiate data synchronization from the source storage system to the target storage system (block 506). With this process, the source storage system stops exposing the migrating volume, and makes the paths to the source storage system inactive so that all I/Os to the migrating volume are serviced by the target storage system. At this point, the source storage system can remove/delete the source volume.

Furthermore, as part of the migration cleanup process, the source storage system proceeds to utilize the host connectivity management system to automate the removal of the host connections to the source storage system with respect to the migrating volume (block 507), and the source volume on the source storage system is removed. For example, in some embodiments, as an initial step, the source storage system sends the host a request (or notification) to perform discovery to obtain updated connection information for connecting to the source storage system. For example, the source storage system sends the host a request to read an updated NVMe discovery log page. Further, in some embodiments, when the host remains connected to the local discovery system of the source storage system using a persistent discovery controller, the source storage system can send an asynchronous event request to the host indicating a change in the discovery information, which triggers the host to send a discovery request to the discovery system of the source storage system. In other embodiments, the source storage system can send a notification message (e.g., alert message) to the host requesting a manual rediscovery operation to be triggered on the host.

In response to the request, the host system will send a discovery request (e.g., "Get Log Page" request, "SendTargets" request, etc.) to the source storage system to obtain updated connection information to the source target system. Upon receiving the discovery request from the host, the source storage system (via the local discovery system on the source storage system) responds to the host by providing updated connection information which excludes the ports of the source storage system to which the host is connected for accessing the migrating volume. For example, in some embodiments, the discovery system of the source storage system will send the host an updated discovery log page, which excludes the ports of the source storage system that the host should no longer connect to for accessing the migrating volume. There are instances where the host may need to remain connected to the source storage system to access one or more volumes on the source storage system, or it may no longer require connectivity through some, or all, of the source system ports to which it was previously connected. The discovery system of the source storage system takes this into account when determining which ports should be included or removed from the discovery log page. The host is expected to follow the updated connection information (e.g., updated discovery log page) provided by the source storage system and disconnect from the ports of the source storage system which are not included in the updated connection information received from the source storage system.

Following host disconnection from the source volume, the source storage system commences a commit process to complete the migration process (block 508). More specifically, after the source to target data synchronization is complete and all application data has been migrated to the target system, a commit operation is performed to release the temporary resources allocated to perform the migration, and to remove the system-to-system connection configured for the data migration pathway.

The exemplary process flows of FIGS. 4 and 5 illustrate techniques for automated load balancing of I/O workloads across resources of storage systems, where storage system-driven host connectivity management is utilized to automate the connectivity updates of a given host system to a given storage system to balance the I/O workload across the resources of the given host system, or to automate the connectivity of a host system to source and target storage systems during a non-disruptive migration process which is commenced to achieve load balancing between storage systems. The use of the storage system-driven host connectivity management process as part of the load balancing operations simplifies the host connection operations from the user perspective and significantly reduces the risk of user error which may lead to loss of access which could otherwise occur if a user would need to manually balance the I/O workload across all available resources of storage system, which is not only time consuming and tedious, but it is also error prone.

Figure 6:
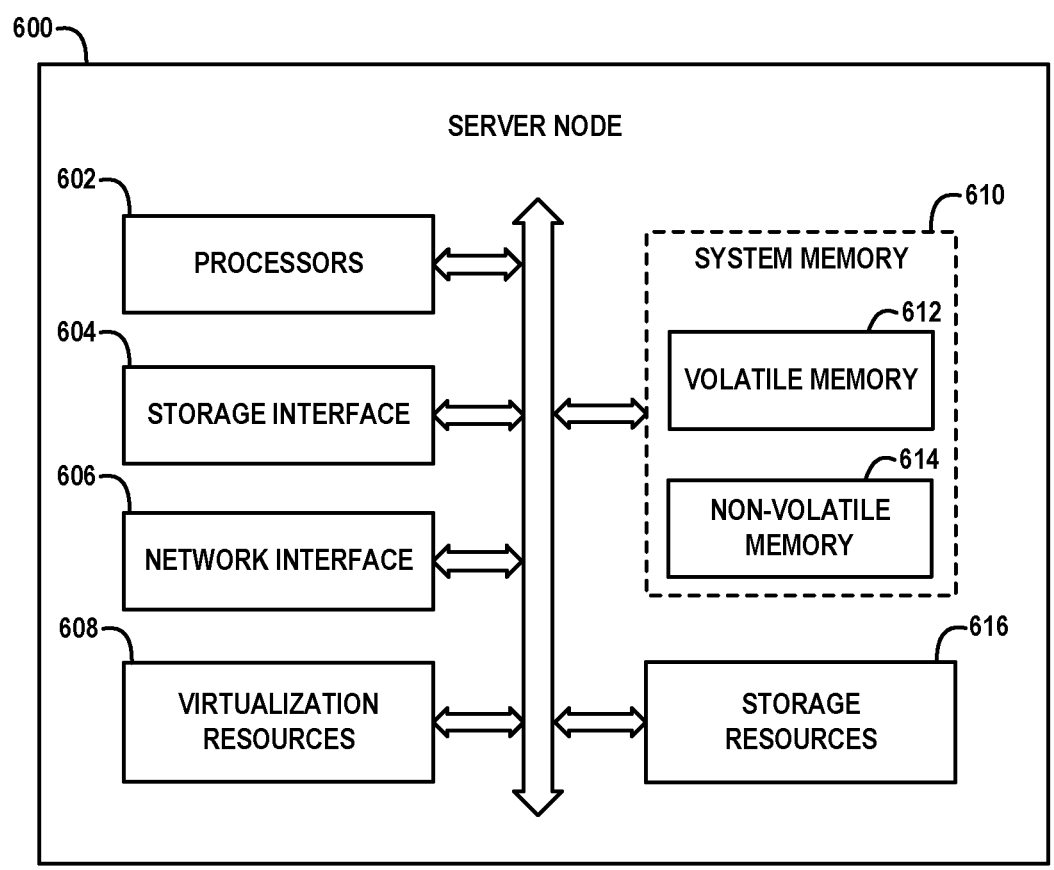
FIG. 6 schematically illustrates a framework of a storage server node for implementing a storage system and associated functionality, according to an exemplary embodiment of the disclosure.

FIG. 6 schematically illustrates a framework of a storage server node for implementing a storage system and associated functionality, according to an exemplary embodiment of the disclosure. In some embodiments, FIG. 6 illustrates an exemplary embodiment of server node 600 which comprises processors 602, storage interface circuitry 604, network interface circuitry 606, virtualization resources 608, system memory 610, and storage resources 616. The system memory 610 comprises volatile memory 612 and non-volatile memory 614. The processors 602 comprise one or more types of hardware processors that are configured to process program instructions and data to execute a native operating system (OS) and applications that run on the server node 600.

For example, the processors 602 may comprise one or more CPUs, microprocessors, microcontrollers, application specific integrated circuits (ASICs), field programmable gate systems (FPGAs), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, graphics processing units (GPUs), digital signal processors (DSPs), system-on-chip (SoC), tensor processing units (TPUs), image processing units (IPUs), deep learning accelerators (DLAs), artificial intelligence (AI) accelerators, and other types of specialized processors or coprocessors that are configured to execute one or more fixed functions.

The storage interface circuitry 604 enables the processors 602 to interface and communicate with the system memory 610, the storage resources 616, and other local storage and off-infrastructure storage media, using one or more standard communication and/or storage control protocols to read data from or write data to volatile and non-volatile memory/storage devices. Such protocols include, but are not limited to, NVMe, PCIe, PATA, SATA, SAS, Fibre Channel, etc. The network interface circuitry 606 enables the server node 600 to interface and communicate with a network and other system components. The network interface circuitry 606 comprises network controllers such as network cards and resources (e.g., network interface controllers (e.g., SmartNICs, RDMA-enabled NICs), Host Bus Adapter (HBA) cards, Host Channel Adapter (HCA) cards, I/O adaptors, converged Ethernet adaptors, etc.) to support communication protocols and interfaces including, but not limited to, PCIe, DMA and RDMA data transfer protocols, etc.

The virtualization resources 608 can be instantiated to execute one or more services or functions which are hosted by the server node 600. For example, the virtualization resources 608 can be configured to implement the various modules and functionalities of, e.g., the host connectivity management systems, load balancing control systems, and non-disruptive migration control systems, as discussed herein. In some embodiments, the virtualization resources 608 comprise virtual machines that are implemented using a hypervisor platform which executes on the server node 600, wherein one or more virtual machines can be instantiated to execute functions of the server node 600. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the server node 600, and emulates the CPUs, memory, hard disk, network and other hardware resources of the host system, enabling multiple virtual machines to share the resources. The hypervisor can emulate multiple virtual hardware platforms that are isolated from each other, allowing virtual machines to run, e.g., Linux and Windows Server operating systems on the same underlying physical host. The underlying physical infrastructure may comprise one or more commercially available distributed processing platforms which are suitable for the target application.

In other embodiments, the virtualization resources 608 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the server node 600 as well execute one or more of the various modules and functionalities as discussed herein. In yet another embodiment, containers may be used in combination with other virtualization infrastructure such as virtual machines implemented using a hypervisor, wherein Docker containers or other types of LXCs are configured to run on virtual machines in a multi-tenant environment.

In some embodiments, the various components of the host connectivity management system 200 (FIG. 2) and the load balancing control system 162 (FIG. 1) comprise program code that is loaded into the system memory 610 (e.g., volatile memory 612), and executed by the processors 602 to perform respective functions as described herein. In this regard, the system memory 610, the storage resources 616, and other memory or storage resources as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the disclosure. An article of manufacture may comprise, for example, a storage device such as a storage disk, a storage system or an integrated circuit containing memory. The term "article of manufacture" as used herein should be understood to exclude transitory, propagating signals.

The system memory 610 comprises various types of memory such as volatile RAM, NVRAM, or other types of memory, in any combination. The volatile memory 612 may be a dynamic random-access memory (DRAM) (e.g., DRAM DIMM (Dual In-line Memory Module), or other forms of volatile RAM. The non-volatile memory 614 may comprise one or more of NAND Flash storage devices, SSD devices, or other types of next generation non-volatile memory (NGNVM) devices. The system memory 610 can be implemented using a hierarchical memory tier structure wherein the volatile memory 612 is configured as the highest-level memory tier, and the non-volatile memory 614 (and other additional non-volatile memory devices which comprise storage-class memory) is configured as a lower level memory tier which is utilized as a high-speed load/store non-volatile memory device on a processor memory bus (i.e., data is accessed with loads and stores, instead of with I/O reads and writes). The term "memory" or "system memory" as used herein refers to volatile and/or non-volatile memory which is utilized to store application program instructions that are read and processed by the processors 602 to execute a native operating system and one or more applications or processes hosted by the server node 600, and to temporarily store data that is utilized and/or generated by the native OS and application programs and processes running on the server node 600. The storage resources 616 can include one or more HDDs, SSD storage devices, etc.

It is to be understood that the above-described embodiments of the disclosure are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of such embodiments. Numerous other alternative embodiments within the scope of the appended claims will be readily apparent to those skilled in the art.

What is claimed is:

1. A method, comprising:
monitoring a distribution of input/output (I/O) workload across resources of a storage system to detect for an occurrence of an I/O workload imbalance;
generating updated connection information for a host system connected to the storage system, in response to detecting the occurrence of an I/O workload imbalance; and
sending a request to the host system to discover the updated connection information for connecting to the storage system based on the updated connection information;
wherein monitoring the I/O workload across the resources of the storage system comprises monitoring at least one or more of (i) I/O operations per second, (ii) I/O bandwidth, and (iii) I/O response time, across at least one of ports and controllers of the storage system.

2. The method of claim 1, wherein sending a request to the host system to discover the updated connection information for connecting to the storage system comprises:
sending, by the storage system, a request to the host system to send a discovery request to a discovery system associated with the storage system; and
in response to the discovery system associated with the storage system receiving the discovery request from the host system, sending the host system the updated connection information.

3. The method of claim 2, wherein sending the request to the host system to send a discovery request to the discovery system associated with the storage system comprises sending, by the storage system, an asynchronous event notification to the host system from a persistent discovery controller of the discovery system.

4. The method of claim 1, wherein the updated connection information comprises a list of ports of the storage system to which the host system can connect, to enable balancing of the I/O workload across the resources of the storage system.

5. A method, comprising:
monitoring a distribution of input/output (I/O) workload across resources of a storage system to detect for an occurrence of an I/O workload imbalance;
generating updated connection information for a host system connected to the storage system, in response to detecting the occurrence of an I/O workload imbalance; and
sending a request to the host system to discover the updated connection information for connecting to the storage system based on the updated connection information;
wherein the updated connection information comprises a list of ports of the storage system to which the host system can connect, to enable balancing of the I/O workload across the resources of the storage system; and
wherein the host system automatically disconnects from a given port which is not included in the list of ports provided in the updated connection information.

6. The method of claim 1, wherein the monitoring and generating steps are performed by a load balancing control system residing on the storage system.

7. A method, comprising:
monitoring a distribution of input/output (I/O) workload across resources of a storage system to detect for an occurrence of an I/O workload imbalance;
generating updated connection information for a host system connected to the storage system, in response to detecting the occurrence of an I/O workload imbalance;
sending a request to the host system to discover the updated connection information for connecting to the storage system based on the updated connection information;
automatically invoking a migration process to non-disruptively migrate a volume from the storage system to a target storage system while the volume is being accessed by the host system, in response to determining an occurrence of an I/O workload imbalance between the storage system and the target storage system; and
sending a request to the host system to discover information for connecting to the target storage system to allow the host system to access the volume through the target storage system during the migration process.

8. An article of manufacture comprising a non-transitory processor-readable storage medium having stored therein program code of one or more software programs, wherein the program code is executable by one or more processors to implement a method which comprises:
monitoring a distribution of input/output (I/O) workload across resources of a storage system to detect for an occurrence of an I/O workload imbalance;
generating updated connection information for a host system connected to the storage system, in response to detecting the occurrence of an I/O workload imbalance; and
sending a request to the host system to discover the updated connection information for connecting to the storage system based on the updated connection information;
wherein monitoring the I/O workload across the resources of the storage system comprises monitoring at least one or more of (i) I/O operations per second, (ii) I/O bandwidth, and (iii) I/O response time, across at least one of ports and controllers of the storage system.

9. The article of manufacture of claim 8, wherein the program code for sending a request to the host system to discover the updated connection information for connecting to the storage system comprises program code for:
sending, by the storage system, a request to the host system to send a discovery request to a discovery system associated with the storage system; and
in response to the discovery system associated with the storage system receiving the discovery request from the host system, sending the host system the updated connection information.

10. The article of manufacture of claim 9, wherein the program code for sending the request to the host system to send a discovery request to the discovery system associated with the storage system comprises program code for sending, by the storage system, an asynchronous event notification to the host system from a persistent discovery controller of the discovery system.

11. The article of manufacture of claim 8, wherein the updated connection information comprises a list of ports of the storage system to which the host system can connect, to enable balancing the I/O workload across the resources of the storage system.

12. The article of manufacture of claim 11, wherein host system is configured to automatically disconnect from a given port which is not included in the list of ports provided in the updated connection information.

13. The article of manufacture of claim 8, wherein the monitoring and generating steps are performed by a load balancing control system residing on the storage system.

14. The article of manufacture of claim 8, further comprising program code which is executable by the one or more processors to implement a method which comprises:
automatically invoking a migration process to non-disruptively migrate a volume from the storage system to a target storage system while the volume is being accessed by the host system, in response to determining an occurrence of an I/O workload imbalance between the storage system and the target storage system; and
sending a request to the host system to discover information for connecting to the target storage system to allow the host system to access the volume through the target storage system during the migration process.

15. An apparatus, comprising:
a storage system comprising at least one processor, and a system memory configured to store program code, wherein the program code is executable by the at least one processor to configure the storage system to:
monitor a distribution of input/output (I/O) workload across resources of the storage system to detect for an occurrence of an I/O workload imbalance;
generate updated connection information for a host system connected to the storage system, in response to detecting the occurrence of an I/O workload imbalance; and
send a request to the host system to discover the updated connection information for connecting to the storage system based on the updated connection information;

wherein in monitoring the I/O workload across the resources of the storage system, the storage system is configured to monitor at least one or more of (i) I/O operations per second, (ii) I/O bandwidth, and (iii) I/O response time, across at least one of ports and controllers of the storage system.

16. The apparatus of claim 15, wherein in sending a request to the host system to discover the updated connection information for connecting to the storage system, the storage system is configured to:
send a request to the host system to send a discovery request to a discovery system associated with the storage system; and
in response to the discovery system associated with the storage system receiving the discovery request from the host system, send the host system the updated connection information.

17. The apparatus of claim 15, wherein storage system is further configured to:
automatically invoke a migration process to non-disruptively migrate a volume from the storage system to a target storage system while the volume is being accessed by the host system, in response to determining an occurrence of an I/O workload imbalance between the storage system and the target storage system; and
send a request to the host system to discover information for connecting to the target storage system to allow the host system to access the volume through the target storage system during the migration process.

18. The apparatus of claim 16, wherein in sending the request to the host system to send a discovery request to the discovery system associated with the storage system, the storage system is configured to send an asynchronous event notification to the host system from a persistent discovery controller of the discovery system.

19. The apparatus of claim 15, wherein the updated connection information comprises a list of ports of the storage system to which the host system can connect, to enable balancing of the I/O workload across the resources of the storage system.

20. The apparatus of claim 15, wherein storage system is configured to implement a load balancing control system to monitor the distribution of the I/O workload across resources of the storage system.

* * * * *